INVENTOR.
JOHN L. LANE
BY
ATTYS

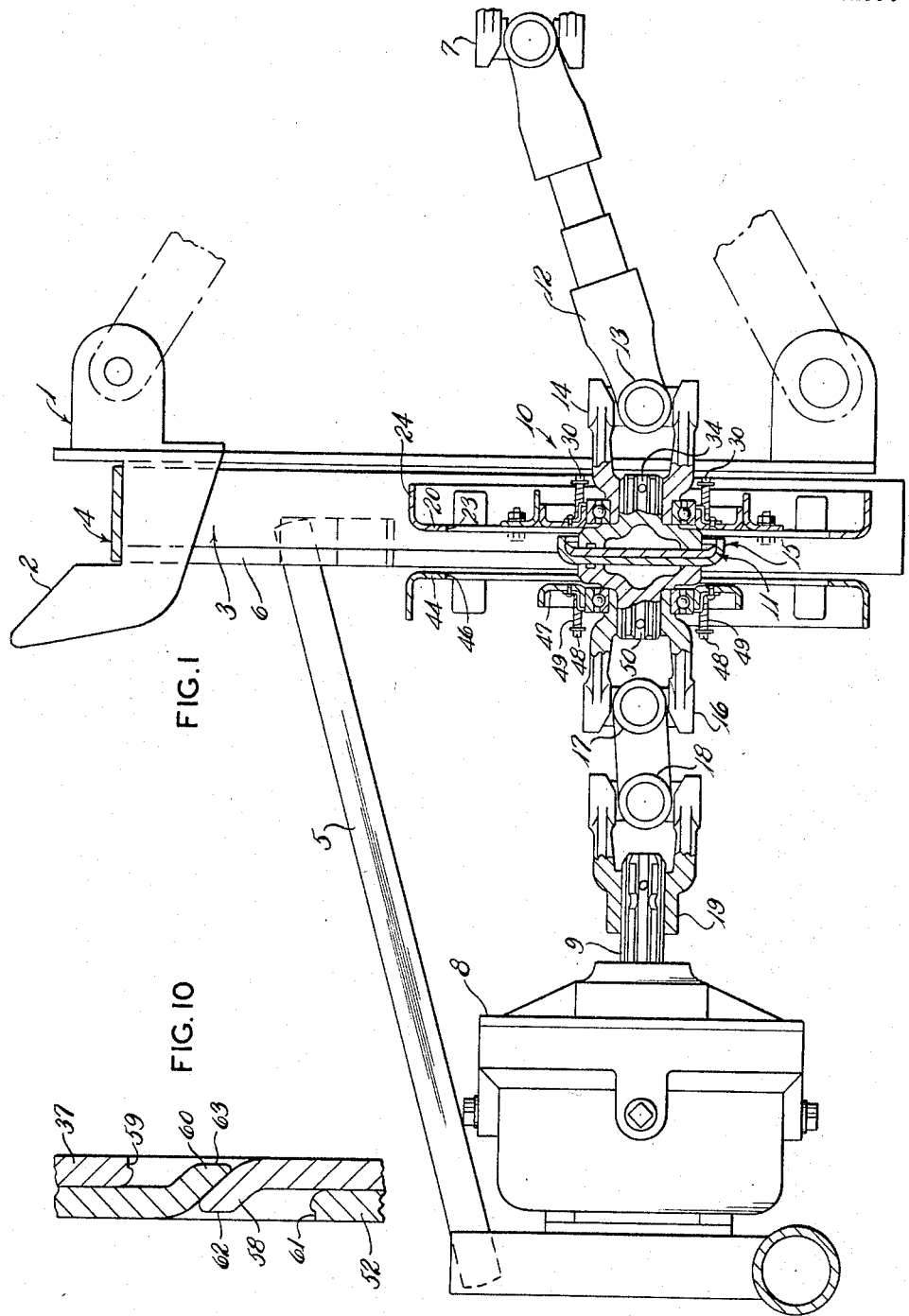

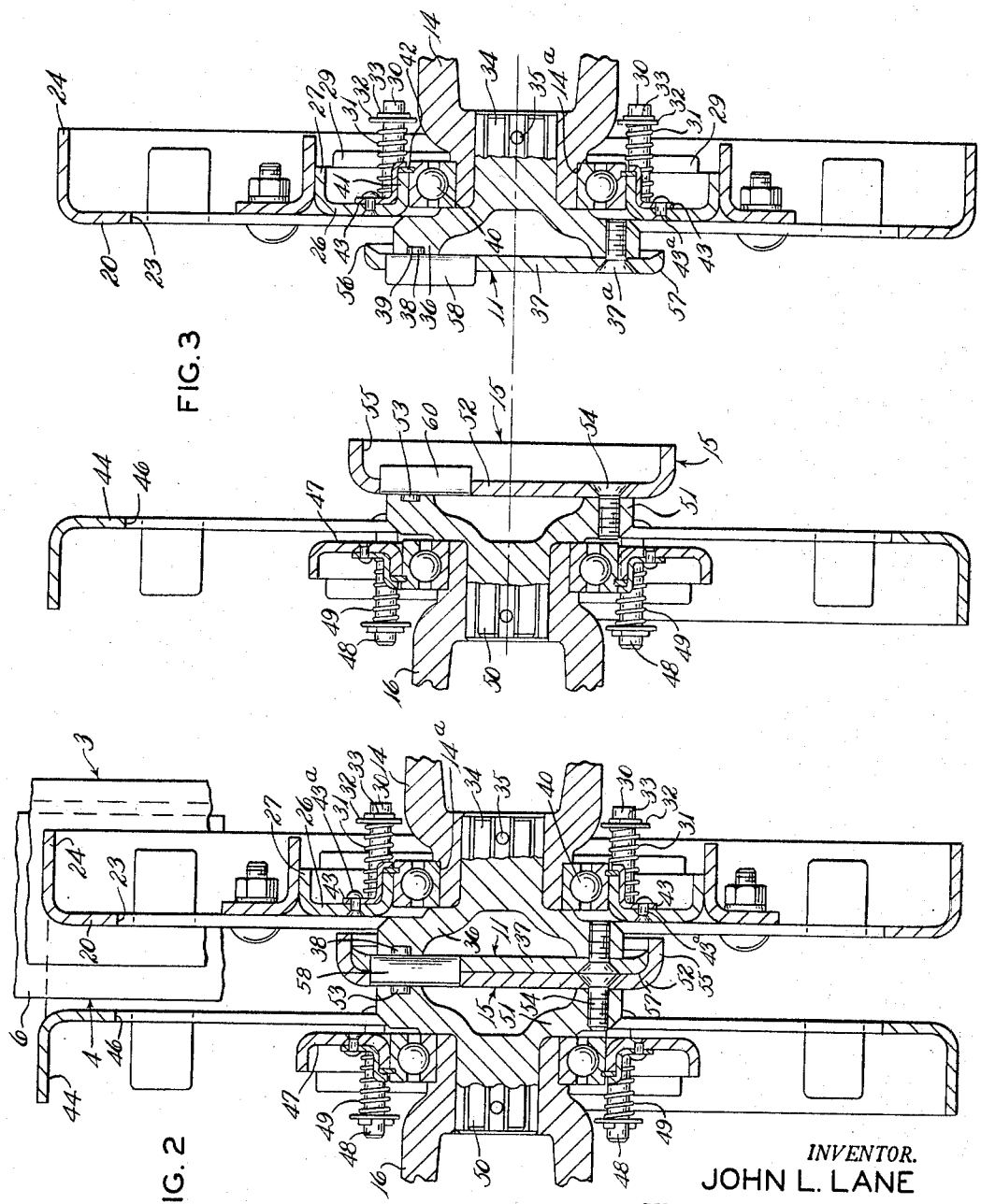

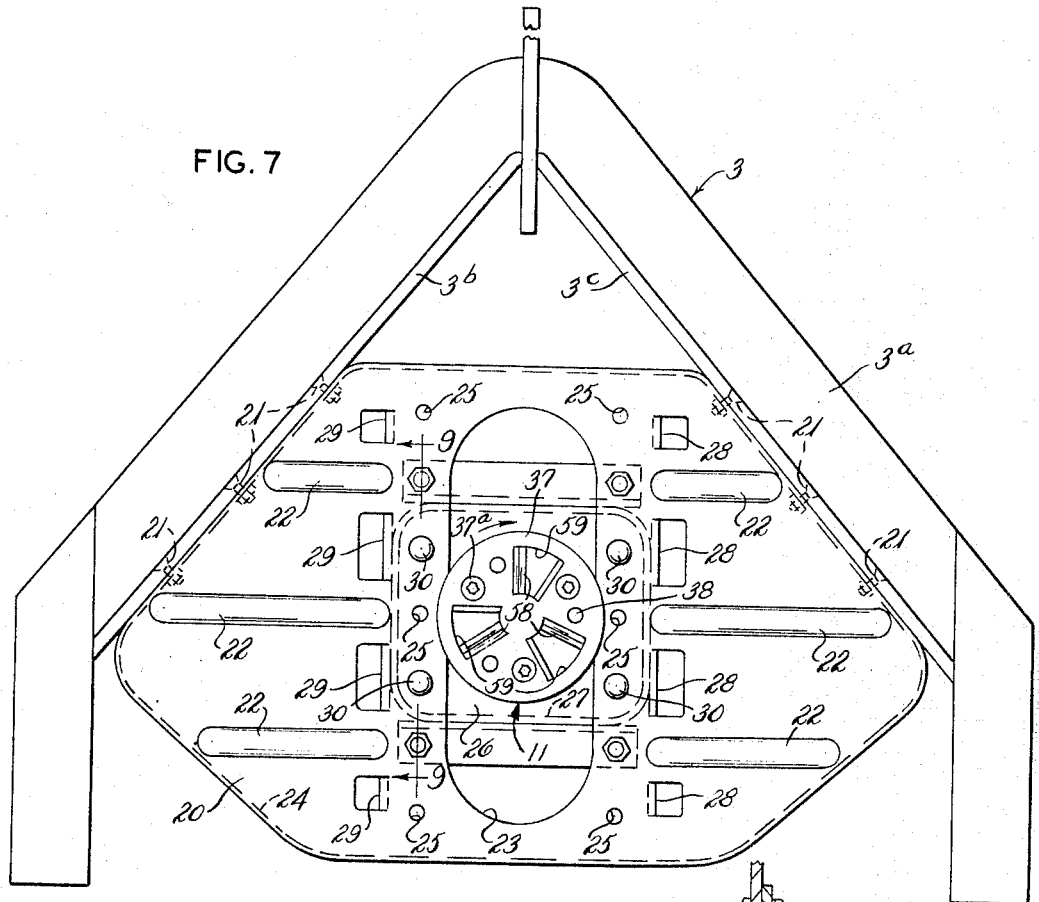
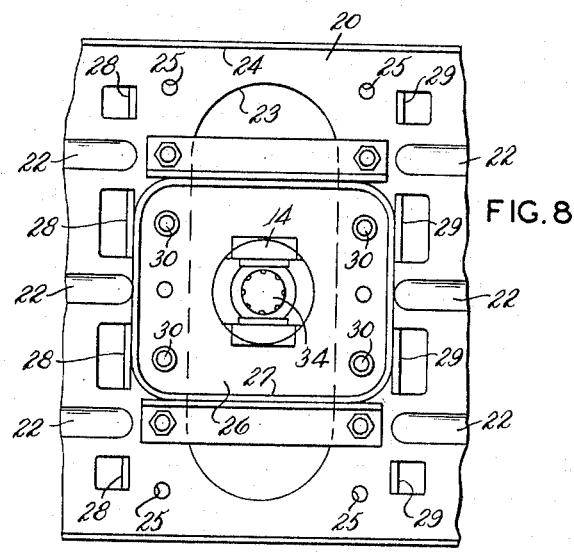
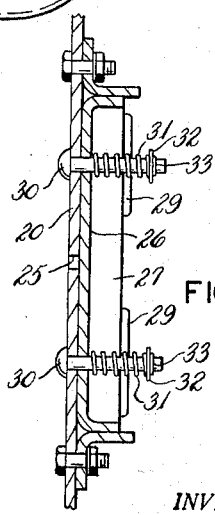

United States Patent Office 3,283,840
Patented Nov. 8, 1966

1

3,283,840
AUTOMATICALLY ENGAGEABLE POWER
TAKE-OFF COUPLING
John L. Lane, Warren, Ohio, assignor of fifty percent to
Guy E. Lane, Youngstown, Ohio, and fifty percent to
Weather-Seal, Inc., N. Barberton, Ohio, a corporation
of Ohio
Filed June 18, 1963, Ser. No. 288,720
5 Claims. (Cl. 180—14)

The present invention relates to power take-off couplings, and especially to an automatically engageable power take-off coupling for use with tractors and farm implements, or similar heavy equipment, requiring transmission of relatively large amounts of rotary power by sturdy power take-off and coupling means.

Heretofore there have been some efforts made to provide sturdy, automatic types of coupling means for vehicles, such as tractors and farm implements, and one of such previous structures is shown in Patent No. 2,869,660. Yet another type of automatically engageable power coupling means for use with tractors and the like is shown in my own prior U.S. Patent No. 3,074,501.

These prior types of coupling means have been adapted to use with various hitch devices, such as the Ford or Ferguson 3-point hitch, or the hitches shown in U.S. Patents Nos. 2,685,453; 2,888,995 and 3,029,092, for example. In such types of hitches, relative movement is provided between the hitch member operatively carried on the tractor and the hitch member that is normally attached permanently to the farm implement. After the hitch means have been engaged, it then is important that the power take-off coupling means be readily engageable and/or be automatically engaged with each other by the complete and final engagement of the hitch members so that power can be transmitted to the associated farm implement.

While some of such previous types of hitch means and power take-off couplings have functioned satisfactorily, and particularly that structure shown in Patent No. 3,074,501, above-identified, has given excellent results, still it is desirable to improve the speed at which such power coupling means can be engaged, and to provide a smoother power take-off and inherent clutching action in the power take-off means.

The general object of the present invention is to provide a new and improved automatically engageable power take-off coupling for vehicles of the class referred to hereinbefore, and which power coupling means is characterized by the provision of a pair of plate-like means in the coupling and with one of such plate means being of a cup shape in vertical section to snugly receive the other plate member therein and aid in automatic alignment and engagement therebetween and retention of such engagement by preventing relative vertical movement between the plate means.

A further object of the invention is to provide a power take-off coupling of the class described where a pair of interengaging lugs are provided on the plate means in the coupling and where recesses or slots are provided in such plate means immediately adjacent such lugs whereby the lugs on the different plates can be interengaged for positive drive action therebetween, and where the lugs provided on each plate extend forwardly therefrom towards the other plate a distance less than the thickness of the plates, and less than the distance of the protruding cup portion on one of the plate means.

Another object of the invention is to provide a power coupling of the class described where a support is present for each of the plate-like coupling means and which supports are individually attached to different hitch members, and to provide a resiliently supported positioning

2 means for each of the coupling means to journal a coupling means thereon and permit change in vertical relationship between the positioning means and coupling means units and the supports on which they are positioned.

Further objects of the invention are to provide a novel and improved power coupling and take-off means characterized by the provision of a quieter operating power coupling means, to provide a power coupling means that has less jar and vibration in it than previous types of couplings, to provide a coupling of the class described wherein the pair of engageable units in the coupling can be readily attached to support means on a hitch and be made from a number of identical parts, to provide improved types of drive plates in the coupling means, to provide improved drive and driven lugs on the plate means to facilitate engagement therebetween, and to provide an improved, sturdy type of power take-off means of the class described, which means can be automatically engaged by engagement of the hitch members on which the power take-off means are mounted.

The foregoing and other objects and advanages of the invention will be made more apparent as the specification proceeds.

Attention now is particularly directed to the accompanying drawings where:

FIG. 1 is a fragmentary vertical section through a tractor and implement hitch assembly showing a power take-off unit embodying the principles of the invention operatively associated therewith;

FIG. 2 is an enlarged vertical section through the automatically engageable power take-off means of FIG. 1;

FIG. 3 is an exploded fragmentary vertical section, like FIG. 2, with the driving and driven members disengaged;

FIG. 7 is a front elevation of the tractor hitch member and the portion of the power take-off and drive means of the invention positioned thereon;

FIG. 8 is a fragmentary enlarged rear elevation of the power take-off means and associated positioning member of the structure shown in FIG. 7;

FIG. 9 is a fragmentary enlarged vertical section taken on line 9—9 of FIG. 7; and FIG. 10 is a fragmentary enlarged vertical section showing the inter-engagement of the driving and driven member in the power take-off means of the invention.

When referring to corresponding members shown on the drawings and referred to in the specification, corresponding numerals are used to facilitate comparison therebetween.

Figure 4:
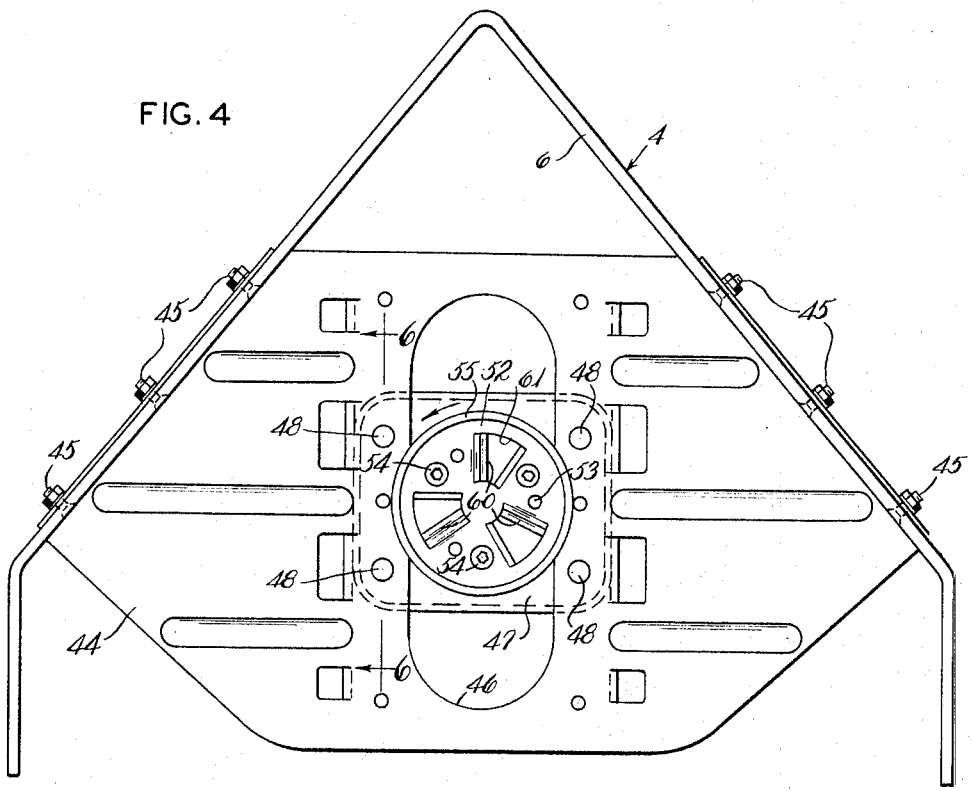
FIG. 4 is a front elevation of the implement hitch member and the portion of the power coupling means of the invention positioned thereon.
Figure 5:
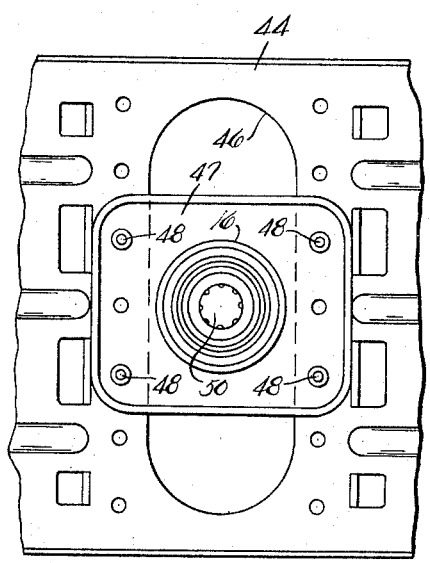
FIG. 5 is a rear elevation of a portion of the power take-off coupling and hitch assembly shown in FIG. 4.
Figure 6:
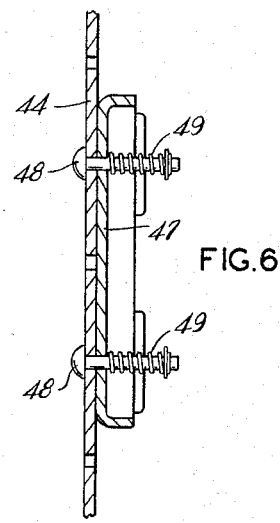
FIG. 6 is a fragmentary enlarged vertical section taken on line 6—6 of FIG. 4.

The present invention, generally speaking, relates to a power coupling for use with a vehicle having a hitch member controllably attached thereto, a rotatable power take-off member on the vehicle, an implement having a hitch member thereon, a driving member carried by the vehicle hitch member and engageable with the power take-off member, a driven member carried by the implement hitch member, and inter-engaging plate-type coupling means operatively carried by the driving and driven members for power transmission therebetween and engageable by relative axial movement therebetween, which hitch members are engageable to bring the driving and driven members into associated positions for engagement of such coupling means, and where the inter-engaging coupling means includes one cup-shaped plate means, and one flat plate means snugly receivable in the cup-shaped plate means for driving engagement therebetween, and where support means are present for the plate-type coupling means to provide vertical adjustment of the coupling means with relation to the hitch members on which they are positioned.

With reference to the details of the structure shown in the drawings, a tractor hitch of the type as shown and described in Patent No. 3,029,092 is shown, and in this embodiment of the invention, a male hitch member 1 is provided. Such male hitch member 1 is suitably positioned on a tractor (not shown) to be controlled in position with relation to the tractor by a plurality of support arms (not shown) as are provided on tractors in known construction and use today and comprising a conventional 3-point hitch connector and control means. This male hitch member 1 includes a rearwardly projecting finger or hook 2 at the upper portion thereof and a substantially inverted V-shaped frame 3 is provided for the hitch member 1, as best shown in FIG. 7, and where one leg 3a of the frame is positioned to extend in a vertical plane, whereas converging flat sides 3b and 3c of the frame are also provided for interlocked engaging action with a female hitch member, indicated as a whole by the numeral 4. This female hitch member 4 is complementary to the male hitch member and is suitably secured to an implement (not shown) that has a support arm 5 extending therefrom for engaging the hitch member. Such female hitch member includes a frame section of inverted V-shape 6, which frame may comprise a flat metal strap that has downwardly extending end portions for attachment to the implement.

The automatic power coupling means of the invention are particularly adapted to provide drive connections between a power take-off shaft, or means 7 that is operatively connected to the power take-off shaft on the tractor and which is adapted to be coupled by the means of the invention to a gear box 8 having a splined driven shaft 9 extending therefrom on the implement, or else to any other suitable driven shaft, like the shaft 9, as is provided on the farm implement for rotary power transmission thereto. The power take-off coupling of the invention is indicated as a whole by the numeral 10. It includes a male coupling member, indicated as a whole by the numeral 11, which is, in this embodiment of the invention, operatively connected to the drive shaft or means 7 provided on the tractor by a suitable connector assembly 12 that includes a universal joint 13 and ending with a drive sleeve 14 operatively connected to the male coupling member 11, as described hereinafter in more detail.

The associated portion of the power take-off coupling 10 is in this instance a female coupling member 15 that in turn connects through a sleeve 16 and a plurality of universal joints 17 and 18 to a driven sleeve 19 which in turn has a longitudinally adjustable connection to the splined shaft 9 for drive transmission to the implement with which the apparatus of the invention is to be used.

In engaging tractor and implement hitch members as disclosed in the present invention, the male hitch member 1 would be lowered by the tractor linkage, and/or be tilted backwardly thereby, until the top of its hook 2 is below the top of the female hitch member 4 of the implement to be hooked to the tractor. The tractor is then usually backed towards the equipment until the hook passes in under the top of the female hitch member 4 and extends to the other side thereof. The power actuated linkage on the tractor is next operated to raise the male member, or to tilt it forwardly and upwardly to an upright position to bring the hitch members into engagement. Such action is obtained readily if the tractor is on level ground and if the hitch members are oppositely centered with relation to each other so that the two hitch members will take the nesting position shown in FIG. 1 of the drawings. If the tractor and hitch means are on irregular ground or not properly centered, one or the other of the converging side portions of the female hitch member will be engaged by the hook 2 which, as it rises, will bring the tractor and equipment into properly centered alignment so that the desired automatic hitch action can be obtained. Simultaneously, or at least substantially simultaneously with the proper engagement of the hitch members 1 and 4, the male and female coupling members 11 and 15 will be brought into aligned association with each other for either automatic coupling engagement therebetween concurrently, or substantially concurrently with the hitching action, or for power transmission engagement as soon as drive is transmitted to the male coupling member to facilitate rotary interlock between portions of the coupling members, as hereinafter described in more detail.

The details of the male coupling member 11 are best shown in FIGS. 2, 3 and 7 of the drawings and it will be seen that the frame 3 has a positioning plate or support 20 secured to portions of the frame 3 spaced vertically downwardly from the apex thereof, which support 20 extends across the open center of the frame 3 and is suitably secured to the horizontally extending sides 3b and 3c thereof, by suitable means, such as bolts 21. A plurality of horizontally extending reenforcing ribs 22 are shown on the support 20, and a vertically extending center slot 23 is also present in this support 20. Preferably the support 20 has a reenforcing flange 24 extending therearound and facilitating engagement of the support 20 to the frame 3. A pair of transversely spaced vertically extending rows of apertures 25 are provided in the support 20 for vertical adjustment of the male coupling member 11, as hereinafter described in more detail. These apertures 25 are positioned on opposite sides of the slot 23 in equally spaced relationship thereto.

The male coupling member 11 is attached to the support 20 by means of a carrier or positioning plate 26, which plate 26 has a reenforcing edge flange 27 extending therearound and protruding towards the tractor from the flat surface of the positioning plate 26. The positioning plate 26 is shown received between pairs of lugs 28 and 29 that are formed on or struck from the support 20 and extend therefrom towards the tractor with each of the lugs 28 being aligned vertically with each other and with the lugs 29 being similarly arranged in a vertical row for snugly receiving the positioning plate 26 therebetween but for permitting vertical adjustment movement thereof, as desired. The positioning plate 26 is adapted to receive a plurality, usually four, of studs, rivets, or bolts 30 therein that extend through the apertures 25 in the support 20 and which preferably are resiliently attached to the positioning plate 26 by means of coil springs 31 on the studs 30 that bear at one end on the positioning plate 26. The coil springs 31 are urged towards the positioning plate 26 but abutting on means, such as washers 32 and lock rings or cotter pins 33, which are removably engaged with the studs 30 for securing the members together in a removable assembly but to provide some resilience or flexibility in the positioning or mounting of the positioning plate 26 with relation to the support 20 whereby some adjustment is provided for this positioning plate when the coupling means of the invention are being engaged, or are in use.

A clutch, or power take-off, splined drive shaft 34 is provided as an important element of the coupling of the invention and it is received in and engaged with the drive sleeve 14 by a device, such as a lock pin 35, in removable engagement with these members to hold them in desired assembled relationship. The clutch, or coupling drive shaft 34 includes a disc-shaped end 36 to which the drive plate 37 is secured, as by means of cap screws or bolts 37a which are received in countersunk apertures provided in the drive plate 36 and engage tapped holes provided in the end 36 of the drive shaf 34. Good rotative driving engagement between the male drive plate 37 and the end 36 of the clutch drive shaft is also obtained by the provision of a plurality of studs 38 that extend away from the operative face of the male drive plate 37 and are seated in suitable recesses 39 provided in the end 36.

The assembly of the drive shaft 34 and drive sleeve 14 is operatively secured to the positioning plate 26 by means of a conventional roller bearing 40 that engages the periphery of the drive sleeve 14 at a shoulder 14a at the end thereof. The bearing 40 is received in a center aperture of the positioning plate 26 outlined by an annular flange 41. A suitable lock washer, or ring 42 engages a slot in the bearing 40 and abuts on an end of the flange 41. A lock ring 43 is secured to the positioning plate 26 by rivets 43a and engages the lock washer 42 to retain the assembly together.

In general, the construction of the female coupling 15 is very similar to that of the male coupling means 11 so that several parts thereof can be used interchangeably on either portion of the coupling members, as desired. FIG. 4 shows a support 44 secured to the female hitch member frame 6 by suitable bolts 45. Such support has a vertically extending center slot 46 therein with which a positioning plate 47, like the positioning plate 26, is operatively associated.

As best shown in FIGS. 2, 3, 5 and 6, the positioning plate 47 is secured to the support 44 by a plurality of pins, or rivet means 48 having coil springs 49 carried thereon and removably attached thereto, like the studs 30, for resiliently urging the positioning plate 47 against the surface of the support 44 facing the implement in the vehicle and implement assembly. The driven sleeve 16 is secured to a female or clutch driven shaft 50 that also has a disc-like end 51 provided thereon, like the drive shaft 34. The end 51 engages a female drive plate 52 by a plurality of dowels 53 and cap screws 54, as shown in FIG. 2 of the drawings.

The particular relationship and connection between the male drive plate 37 and the female or driven plate 52 are important portions of the present invention, and FIG. 3 of the drawings best shows that the female or driven plate 52 is flat for the major portion thereof but is of cup-shape in vertical section and has an annular edge flange 55 extending therearound in which the male drive plate 37 is snugly received to be held against any relative vertical, or lateral displacement with relation thereto. To facilitate such engagement, the face of the male drive plate 37 adjacent the female or driven plate is stamped, or coined, and then ground to have a reenforcing edge portion 56 that extends away from the operative face of the plate, or back towards the tractor portion of the vehicle assembly. Such edge portion 56 has a smoothly curved front edge, or peripheral section 57 to seat snugly in the curved or arcuate connection provided between the edge flange 55 and the planar flat surface of the driven plate 52.

As in the type of automatically engageable coupling means shown in Patent No. 3,074,501, the drive plate 37 is provided with a plurality of circumferentially spaced, generally radially extending drive lugs 58 extending angularly therefrom, which lugs have companion slots 59 formed therein, one at the free end of each of the drive lugs 58. Complementary shaped driven lugs 60 are provided on the driven plate 52 and they have slots 61 formed therein immediately adjacent each of the driven lugs 60 whereby the lugs 58 and 60 can be interengaged with each other and extend into the slots 61 and 59, respectively, provided adjacent each of these lugs, as best shown in FIG. 10. It is a feature of the invention that these lugs 58 and 60 do not protrude farther from the plates on which they are provided than the thickness of the associated plate whereby even when these lugs are interengaged, they will not protrude through the associated plate. As the lugs are inclined with relation to the associated flat surfaces of the driving and driven plates, they are adapted to interlock with each other for driving connection therebetween when they are brought into axially aligned positions by automatic engagement of the male and female hitch members of the invention which will likewise position these driving and driven plates for engagement between the lugs 58 and 60 as soon as power is transmitted to the power take-off shaft of the tractor. These lugs 58 and 60, as a further feature, have surfaces indicated at 62 and 63 thereon, respectively, on the lugs 58 and 60 that are flat and parallel to the flat surfaces of the plates on which they are formed. This facilitates the driving engagement of the lugs and it also permits the lugs 60 on the driven plate 52 to ride over the lugs 58 on the driving plate when the power supplied from the tractor is interrupted by axial movement of the positioning plates 26 and 47 permitted by the resilient positioning of each of such plates. This action is obtained with a minimum of jar and noise in the power take-off coupling at that time.

When one desires to disengage the power take-off coupling means of the invention, the operations of engaging the male and female hitch members are merely reversed. Hence the power actuated linkage on the tractor is operated so as to start the frame 3 of the male hitch member to be tilted to have the lower end thereof move towards the tractor and to have the tractor male hitch frame 3 lowered, after the tilting action has been started. The tilting action will disengage the lugs 58 and 60 and will permit the power take-off coupling means of the invention to be separated from each other without any other control except for the automatic movement provided therebetween by the power controlled hitch means of the invention. Then continued tilting or dropping movement of the male hitch member 1 will permit the entire male hitch member to be withdrawn from association with the female hitch member 4 and the tractor can be moved so as to engage another implement, or for other action, as desired.

From the foregoing, it is believed that it will be seen that a new and improved automatically engageable power take-off coupling means has been provided by the invention. This power take-off coupling can be easily vertically adjusted in position on an implement, or on a tractor, to facilitate engaging any of a number of different implements at different heights with relation to the tractor. Furthermore, the new and improved power take-off coupling will have a relatively quiet action and provides an effective power transmission means between a tractor and associated implement. The power take-off means are of a sturdy construction, require no manual connection action, and are adapted to have a long service life with a minimum of wear and maintenance thereon. Hence it is believed that the objects of the invention have been achieved.

What I claim is:

1. In a power coupling for use with a vehicle having a hitch member attached thereto, a power supply member on the vehicle, an implement having a hitch member thereon, a driving member carried by said vehicle hitch member and engageable with said power supply member, a driven member carried by said implement hitch member, and interengaging plate-type coupling means operatively carried by said driving member and by said driven member for power transmission therebetween and for engagement by relative axial movement therebetween, said hitch members being engageable upon relative movement therebetween to connect the tractor and implement together, while action also brings said driving and driven members into aligned positions for engagement of said coupling means, the combination of:

a support for each of said coupling means individually attached to said hitch member, each said support having a pair of vertically aligned lug means thereon, a positioning means for each of said coupling means journalling a said coupling means therein and being resiliently secured to a said support, each of said positioning means engaging a said pair of said lug means.

2. In a power coupling for use with a vehicle having a hitch member attached thereto, a power supply member on the vehicle, an implement having a hitch member thereon, a driving member carried by said vehicle hitch member and engageable with said power supply member, a driven member carried by said implement hitch member, and inter-engaging plate-type coupling means operatively carried by said driving member and by said driven member for power transmission and for engagement by relative axial movement therebetween, said hitch members being engageable upon relative movement therebetween to connect the tractor and implement together, while action also brings said driving and driven members into aligned positions for engagement of said coupling means, the combination of:

a support for each of said coupling means individually attached to a said hitch member, each said support having a vertically extending slot therein and a pair of vertically aligned lug means thereon spaced from the margins of said slots, a positioning means for each of said coupling means journalling a said coupling means therein and being resiliently secured to a said support, each of said positioning means engaging a said pair of said lug means to be retained against lateral movement thereby.

3. In a power coupling for use with a vehicle having a hitch member attached thereto, a power supply member on the vehicle, an implement having a hitch member thereon, a driving member including a driving sleeve carried by said vehicle hitch member and engageable with said power supply member, a driven member carried by said implement hitch member and including a driven sleeve, and interengaging plate-type coupling means operatively carried by said driving member and by said driven member for power transmission therebetween and for engagement by relative axial movement therebetween, said hitch members being engageable upon relative movement therebetween to connect the tractor and implement together, while action also brings said driving and driven members into aligned positions for engagement of said coupling means, the combination of:

a support for each of said coupling means individually rigidly attached to a said hitch member, a positioning means for each of said coupling means journalling a said coupling means therein, each of said positioning means including a bearing engaging one of said sleeves, and means attaching said bearings to said positioning means, and means resiliently attaching each of said positioning means to one of said supports to provide limited axial movement of said positioning means.

4. A coupling for use in a tractor and implement combination including a first hitch member on said tractor and a second hitch member on said implement for engaging said first hitch member upon relative movement therebetween, and a driven power supply shaft on said tractor, the combination including:

a driving shaft adapted to be connected to said power supply shaft, a support means on said first hitch member, bearing means journalling said driving shaft therein, bracket means engaging said bearing means, a driving plate with lugs thereon extending generally rearwardly and axially therefrom operatively connected to and carried by said driving shaft, a driven shaft adapted to be coupled to means on said implement for power supply thereto, second bearing means engaging and journalling said driven shaft therein, a second support means engaging said second hitch member, a second bracket means, engaging said second bearing means, attachment means including axially extending studs and resilient means connecting each said bracket means to an associated hitch member for limited axial movement relative thereto, and a driven plate with lugs thereon operatively connected to and carried by said driven shaft, said driven plate lugs being adapted to engage said driving plate lugs for power transmission therebetween when said hitch members are engaged.

5. In a power coupling for use with a vehicle having a hitch member attached thereto, a power supply member on the vehicle, an implement having a hitch member thereon, a driving member including a driving sleeve carried by said vehicle hitch member and engageable with said power supply member, a driven member carried by said implement hitch member and including a driven sleeve, interengaging plate-type coupling means including a drive plate and a driven plate operatively carried by said driving member and by said driven member respectively for power transmission and for engagement by relative axial movement therebetween, and universal joint means connecting to the axially outer ends of each of said driving and said driven sleeves, said hitch members being engageable upon relative movement therebetween to connect the tractor and implement together, while action also brings said driving and driven members into aligned positions for engagement of said coupling means, the combination of:

a support for each of said coupling means individually attached to a corresponding one of said hitch members, and a positioning means for each of said coupling means journalling a said coupling means therein, each of said plate-type coupling means including identical members comprising a shaft engaging one of said sleeves and a disc-shaped end operatively engaging and positioning one of said plates, said driving and driven sleeves being of identical construction, bearing means engaging each of said sleeves, and said positioning means including support means of identical construction engaging each of said bearing means and being resiliently attached to a said support.

References Cited by the Examiner
UNITED STATES PATENTS

| | | | |
|---|---|---|---|
| 2,636,568 | 3/1953 | Rutishauser | 180—53 |
| 2,869,660 | 1/1959 | Miller et al. | 180—53 X |
| 3,074,501 | 1/1963 | Lane et al. | 180—14 |

A. HARRY LEVY, *Primary Examiner.*